(12) United States Patent
Parmentier et al.

(10) Patent No.: US 12,234,737 B2
(45) Date of Patent: Feb. 25, 2025

(54) SYSTEM FOR CONTROLLING DISCHARGE DOORS OF A TURBOMACHINE

(71) Applicant: SAFRAN, Paris (FR)

(72) Inventors: Nicolas Claude Parmentier, Moissy-Cramayel (FR); Gabriel Perez, Moissy-Cramayel (FR)

(73) Assignee: SAFRAN, Paris (FR)

(*) Notice: Subject to any disclaimer, the term of this patent is extended or adjusted under 35 U.S.C. 154(b) by 0 days.

(21) Appl. No.: 18/263,624

(22) PCT Filed: Jan. 26, 2022

(86) PCT No.: PCT/FR2022/050137
§ 371 (c)(1),
(2) Date: Jul. 31, 2023

(87) PCT Pub. No.: WO2022/162306
PCT Pub. Date: Aug. 4, 2022

(65) Prior Publication Data
US 2024/0084713 A1    Mar. 14, 2024

(30) Foreign Application Priority Data
Feb. 1, 2021  (FR) ........................ 2100956

(51) Int. Cl.
*F01D 17/10* (2006.01)
*F01D 17/14* (2006.01)
(Continued)

(52) U.S. Cl.
CPC .......... *F01D 17/10* (2013.01); *F01D 17/105* (2013.01); *F01D 17/141* (2013.01);
(Continued)

(58) Field of Classification Search
CPC ........ F01D 17/105; F01D 17/10; F01D 17/12; F01D 17/141; F01D 17/145;
(Continued)

(56) References Cited

U.S. PATENT DOCUMENTS

| 6,048,171 A | * | 4/2000 | Donnelly | .............. F02C 9/18 60/226.3 |
| 6,094,908 A | * | 8/2000 | Baudu | ................. F02K 1/76 244/110 B |
| 2015/0176529 A1 | | 6/2015 | Todorovic et al. | |

FOREIGN PATENT DOCUMENTS

| EP | 0 515 263 A1 | 11/1992 |
| EP | 0 861 978 A1 | 9/1998 |
| FR | 3 082 562 A1 | 12/2019 |

OTHER PUBLICATIONS

International Search Report and Written Opinion Issued May 3, 2022, in PCT/FR2022/050137, filed on Jan. 26, 2022, 13 pages with English Translation.

* cited by examiner

*Primary Examiner* — Christopher Verdier
(74) *Attorney, Agent, or Firm* — Oblon, McClelland, Maier & Neustadt, L.L.P.

(57) ABSTRACT

A system for controlling discharge doors of a turbomachine includes: a ring and a device connecting the ring to each discharge door. The ring is made up of bars connected end-to-end by rotary links ensuring that a bar pivoting on itself causes the other bars to pivot on themselves, with each discharge door being connected to a corresponding bar in order to open or close when this bar pivots.

8 Claims, 5 Drawing Sheets

(51) Int. Cl.
*F02C 6/08* (2006.01)
*F02C 9/18* (2006.01)
*F04D 27/00* (2006.01)
*F04D 27/02* (2006.01)

(52) U.S. Cl.
CPC .............. *F01D 17/148* (2013.01); *F02C 6/08* (2013.01); *F02C 9/18* (2013.01); *F04D 27/009* (2013.01); *F04D 27/0215* (2013.01); *F04D 27/023* (2013.01); *F05D 2260/53* (2013.01); *F05D 2260/532* (2013.01); *F05D 2270/101* (2013.01)

(58) Field of Classification Search
CPC .. F01D 17/148; F02C 6/08; F02C 9/18; F02K 3/075; F05D 2260/50; F04D 27/0215; F04D 27/023; F04D 27/009
See application file for complete search history.

SYSTEM FOR CONTROLLING DISCHARGE DOORS OF A TURBOMACHINE

TECHNICAL FIELD

The invention relates to opening and closing control of a set of discharge doors fitted to a turbomachine such as a turbojet engine.

PRIOR ART

A turbofan engine comprises an inlet duct taking in air that is drawn in by a fan, before being divided into a central primary flow 1 and a secondary flow 2 that surrounds the primary flow, as shown in FIG. 1. After passing through the fan, the secondary flow is directed backwards to generate thrust.

After passing through the fan, the primary flow passes through a low-pressure compressor 3 then a high-pressure compressor 4 before reaching a combustion chamber to be expanded in a high-pressure turbine then in a low-pressure turbine before being expelled, generating an auxiliary thrust.

The primary flow flows in an annular space 6, called the primary flow path, delimited on the inside in particular by a rotor 7 and on the outside by a fairing 8 between the flow paths. The secondary flow flows in another annular space 9, called the secondary flow path, delimited on the inside by the fairing 8 between the flow paths and on the outside by an external casing 11.

The fairing 8 between the flow paths is traversed by discharge ducts 12 associated and equipped with discharge doors 13, which are opened in certain situations to discharge air from the primary flow towards the secondary flow in order to avoid the establishment of a so-called pumping regime corresponding to over-pressurisation of the compressors likely to damage them.

As shown in FIG. 2, these valves 13 are evenly spaced around the circumference of the fairing 8 between the flow paths such that a relatively complex actuating system is required to open and close them. In the example in FIG. 2, the actuating system comprises a rotary control ring 14 running alongside these valves 13, each valve being connected to the ring by an arrangement of connecting rods. The ring 14 is rotated by a rotary motor 16 to make it pivot about the axis of rotation AX of the motor so as to open and close the valves on command in a synchronised manner.

This ring is thick enough to be sufficiently rigid, and it requires precise guidance, which is provided by pads, all of which are constraints that make such a control system bulky in both the axial and radial directions. Such a system is thus relatively complicated to implement, and therefore costly.

An older alternative shown in FIG. 3 involves providing a torsionally rigid control cable 17 that runs alongside the valves, each valve being connected to this cable 17 by a set of connecting rods. The control therefore involves rotating the circumferential cable on itself to open and close the doors. In practice, the torsional rigidity of the cable is still insufficient, resulting in the door opening being dispersed.

In this context, the object of the invention is to provide an actuating system for such a set of valves that is more robust and less cumbersome than the known systems.

DESCRIPTION OF THE INVENTION

To this end, the object of the invention is a system for controlling discharge doors of a turbomachine, this system comprising a ring and means for connecting this ring to each discharge door, characterised in that the ring is formed by bars connected end to end by rotary connections ensuring that the pivoting of one bar on itself brings about the pivoting of the other bars on themselves, each discharge door being connected to a corresponding bar in order to open or close when this bar pivots.

With this arrangement, the different bars only need to be supported by reasonably sized bearings such that the drive assembly takes up very little space. Driving the system essentially involves driving a bar to pivot on itself in order to actuate all of the valves such that operating the system is straightforward.

The invention also relates to a system defined in this way, comprising alternating control bars and transmission bars, each control bar being connected to a corresponding discharge door.

The invention also relates to a system defined in this way, wherein the rotary connections are universal joints.

The invention also relates to a system defined in this way, comprising an actuator connected to a bar via an actuating lever to make it pivot on itself as it extends and retracts.

The invention also relates to a system defined in this way, comprising a motor rotatably connected to a bar via a worm screw type connection to make this bar pivot when the motor rotates.

The invention also relates to a system defined in this way, comprising a motor rotatably connected to a bar via a reduction gear to make it pivot on itself.

The invention also relates to a system defined in this way, comprising a valve connected to a corresponding bar by an arrangement comprising a lever with one end rigidly attached to the bar, and a connecting rod with one end connected to the valve and its other end connected to the lever, the ends of the connecting rod being connected to the valve and to the lever by pivot connections with axes parallel to the bar.

The invention also relates to a turbomachine comprising a control system according to one of the preceding claims.

The invention also relates to a turbojet engine comprising a control system according to one of the preceding claims.

DETAILED DESCRIPTION OF PARTICULAR EMBODIMENTS

Figure 1:
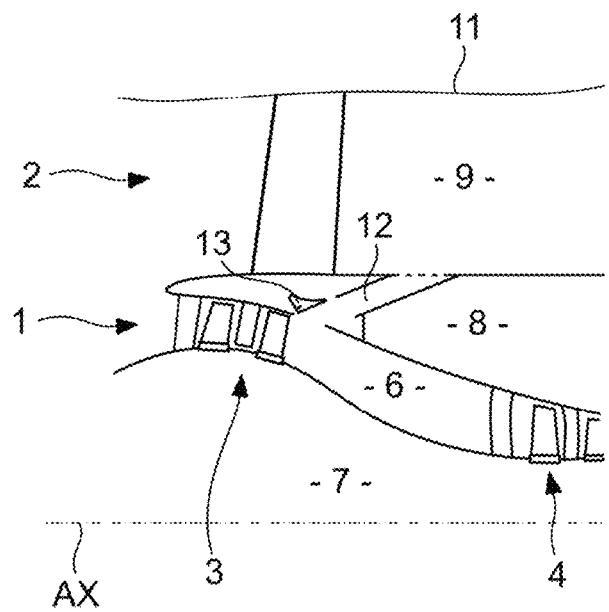
FIG. 1 is a longitudinal sectional view of a front part of the turbojet engine.
Figure 2:
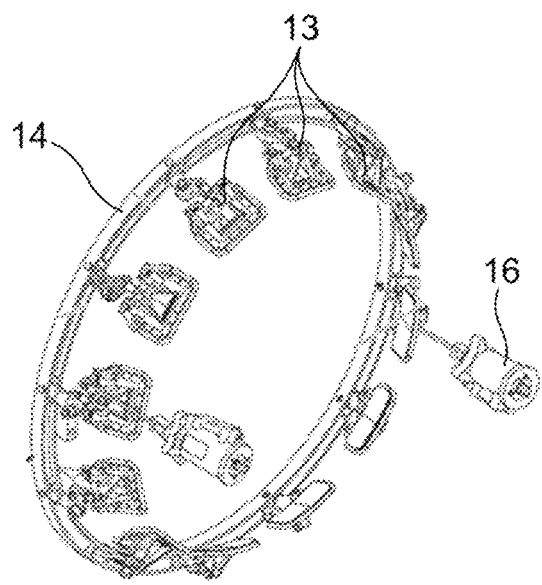
FIG. 2 is a perspective view of a first known control system shown alone.
Figure 3:
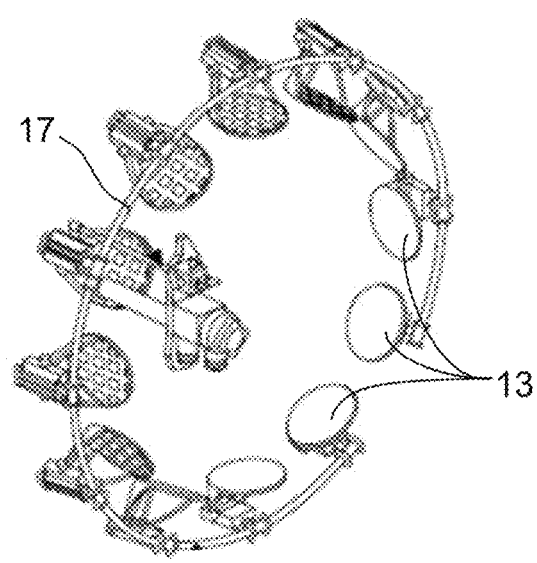
FIG. 3 is a perspective view of a second known control system shown alone.
Figure 4:
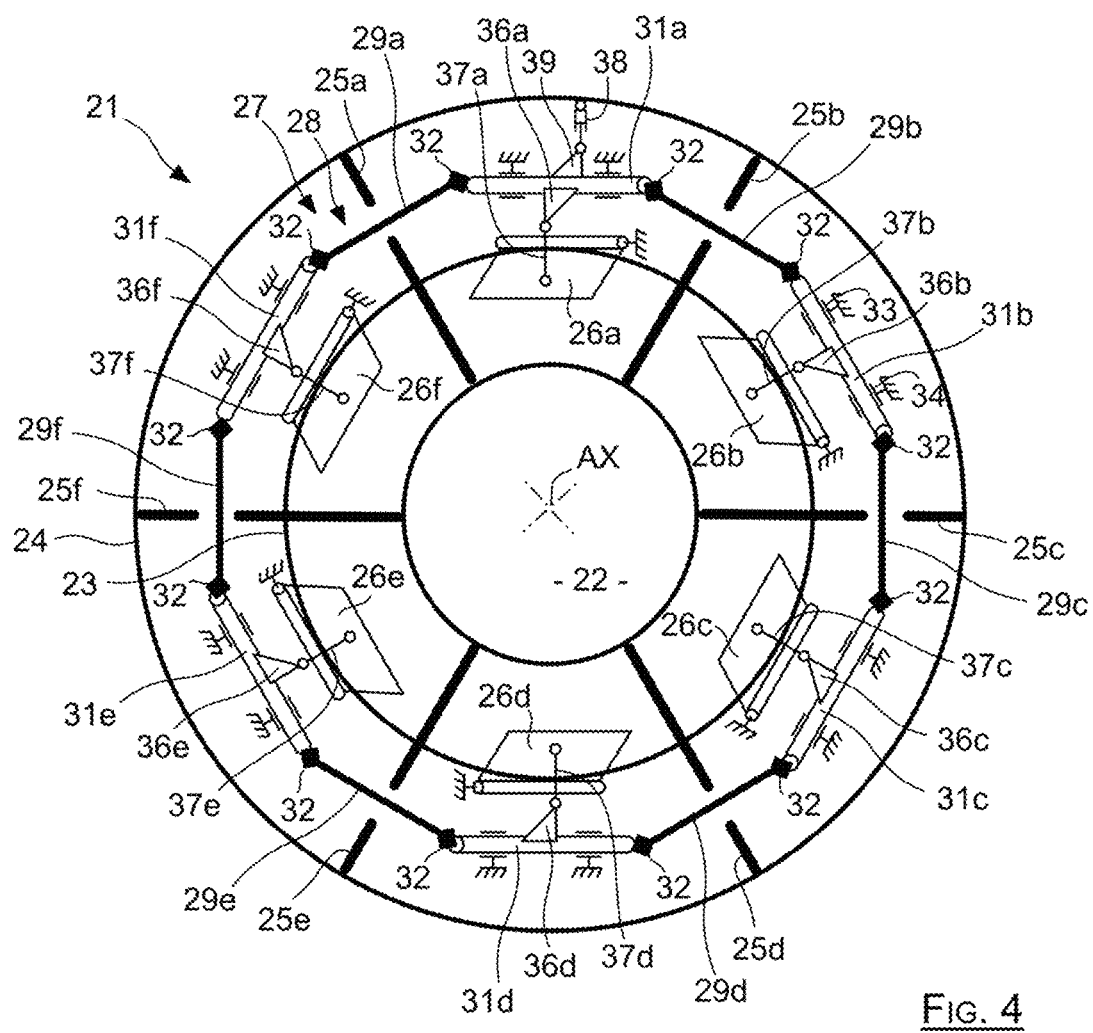
FIG. 4 shows a turbomachine fitted with the control system according to the invention according to a cross-sectional view.

In FIG. 4, a turbojet engine 21 comprises a central rotor 22 surrounded by a fairing between the flow paths comprising an internal wall 23 surrounded by an external wall 24. The annular space extending between the rotor 22 and the wall 23 constitutes the primary flow path in which the primary flow flows, and the space surrounding the external wall 24 corresponds to the secondary flow path in which the secondary flow flows.

The annular space extending between the walls 23 and 24 of the fairing between the flow paths, which is also called the space between the flow paths, contains in particular discharge ducts (not shown) allowing part of the primary flow to be discharged into the secondary flow.

The turbojet engine has six radial arms 25a-25f evenly spaced around the axis of rotation of the rotor, which is marked AX. Each arm 25a-25f extends radially to connect the fairing between the flow paths to invisible supports of the rotor 22.

The fairing between the flow paths is equipped with six discharge doors marked 26a-26f, which allow a portion of the primary flow to be discharged into the secondary flow path when open. Each discharge door is located between two radial arms and is capable of pivoting about an axis oriented orthoradially to the axis AX.

These valves 26a-26f are actuated by a control system 27 comprising a ring 28 surrounding them and which is formed by twelve bars connected end to end by universal joints.

The bars forming the ring 28 comprise transmission bars 29a-29f and control bars 31a-31f, which are arranged alternately around the circumference and connected to each other by universal joints marked 32. Each bar extends in an orthoradial direction with respect to the axis AX, and is capable of pivoting on itself about its orthoradially oriented main axis.

The transmission bars and the control bars have substantially the same length, their arrangement thus corresponding to a regular twelve-sided polygon, as can be seen in FIG. 4. However, it is also possible to use transmission bars with a different length from that of the control bars.

In practice, the number of control bars corresponds to the number of valves, and the number of transmission bars is a multiple of the number of control bars, all sized to fit in the inner region of the fairing between the flow paths.

In the example in FIG. 4, each control bar is supported by two pivot connections 33, 34, which are supported by structural elements (not shown). For its part, each transmission bar is free, i.e. it is only supported by the two control bars to which it is connected by the two universal joints at its ends, and it passes through a corresponding radial arm via an opening formed in the latter.

Each control bar 31a-31f supports a rotary lever 36a-36f extending perpendicularly to this bar, to have its end connected to a corresponding valve by a corresponding connecting rod. These connecting rods are marked 37a-37f, and each connecting rod has one end connected to a valve by a pivot connection and its opposite end connected to the free end of a lever by another pivot connection, these pivot connections having their axes of rotation oriented orthoradially to the axis AX.

The rotary levers 36a-36f extend in directions substantially parallel to the axis of rotation of the rotor whereas the connecting rods 37a-37f each extend in a direction substantially radial to the axis of the rotor, as shown schematically in FIG. 4.

Thus, when the control bar 31a pivots on itself, its lever 36a pivots with it, with its end connected to the valve 26a by the connecting rod 37a, such that the pivoting of the control bar 31a causes the valve 26a to open or close, since in particular the control bar 31a pivots about an axis that is parallel to the pivot axis of the valve 26a. As one would expect, the direction of rotation of the bar determines whether it is a command to open or close the valves.

The same applies to the five other sets comprising the five other bars actuating the five other valves.

As all the bars are connected to one another by universal joints, if one bar pivots on itself, this causes all the bars to pivot on themselves, and thereby opens or closes the six valves, the direction of rotation determining either an opening or a closing movement.

Figure 5:
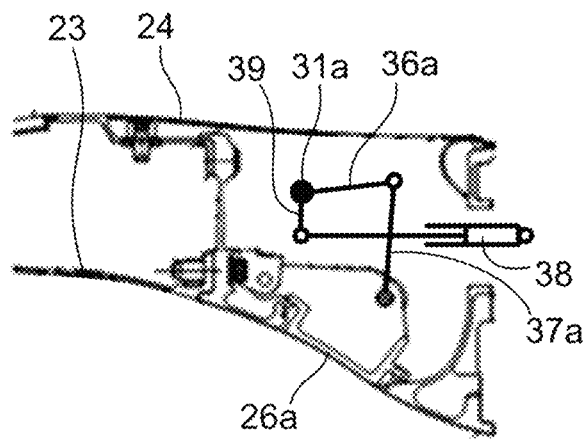
FIG. 5 is a longitudinal sectional view showing a discharge door actuated with the control system according to the invention.

The ring 28 is moved by an actuator, which is a linear actuator 38 in the example of FIGS. 4 and 5, oriented parallel to the axis AX and having its fixed end connected to a structural part of the turbomachine, and its mobile end connected to an actuating lever 39 supported by the bar 31a. As shown in FIG. 5, this actuating lever 39 extends radially towards the axis AX, perpendicular to the lever 36a, which is also supported by this bar 31a.

In this configuration, if the actuator 38 is retracted, this causes the control bar 31a to rotate, which causes the valve 26a to open as it is connected to it by the lever 36a and the connecting rod 37a, as well as opening all the other valves. Similarly, extending the actuator 38 causes the valve 26a and all the other valves to close.

Generally speaking, the system comprises at least one actuator such as the actuator 38, but it can also comprise several of them, each actuating a control bar, evenly distributed around the circumference of the control system. In the example in FIG. 4 comprising six valves, it is thus possible to provide one, two or three actuators.

In the example in FIGS. 4 and 5, the actuator used is an axially oriented linear actuator, but other types of actuators can also be used.

Figure 6:
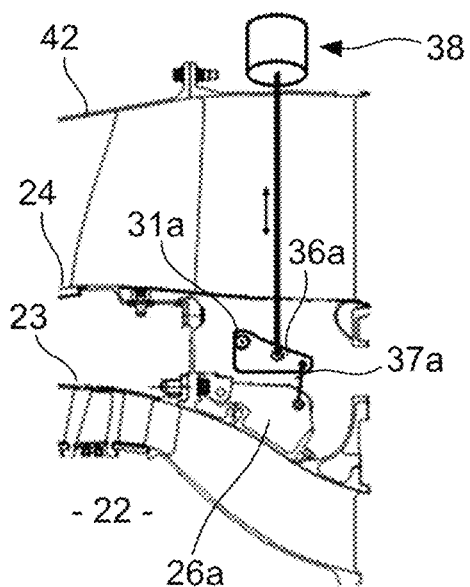
FIG. 6 is a longitudinal sectional view showing a discharge door actuated by a variant of the control system according to the invention.

Thus, in the example in FIG. 6, the linear actuator 38 is positioned radially instead of extending axially as in FIG. 5. More particularly, the actuator 38 is located outside the secondary flow path and is supported on the external face of the external casing 42 surrounding this secondary flow path.

This actuator 38 is connected to the space between the flow paths by means of its mobile rod, which passes radially through the secondary flow path, and the radially internal end of which is connected to the lever 36a via a fixed pivot type connection. Thus, if the actuator 38 is retracted, this causes the control bar 31a to pivot about its orthoradial axis, which causes the valve 26a to which this bar is connected by the lever 36a and the connecting rod 37a to open, as well as opening the other valves.

It is also possible to connect the actuator rod to the bar by means of a rack and pinion connection.

Figure 7:
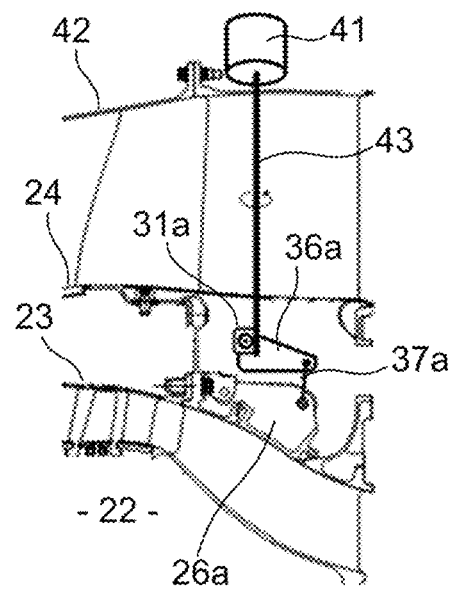
FIG. 7 is a longitudinal sectional view showing a discharge door actuated by another variant of the control system according to the invention.

In the example in FIG. 7, the actuator of the system consists of a rotary motor 41, which is also located outside the secondary flow path and is supported on the external face of the external casing 42.

This motor 41 is connected to the space between the flow paths by means of a rotary shaft 43 passing radially through the secondary flow path, and the radially internal end of which comprises a worm meshed with a toothed wheel supported by the control bar 31a. A rotation of the motor shaft 41 about its radial axis thus causes the control bar 31a to pivot about its orthoradial axis. This causes the valve 26a to which it is connected by the lever 36a and the connecting rod 37a to move, as well as moving the other valves of the system.

Figure 8:
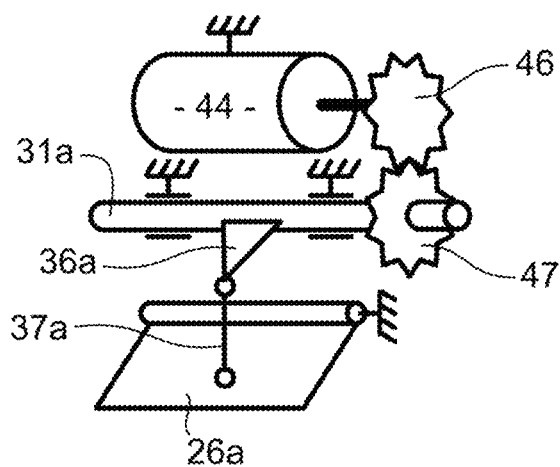
FIG. 8 shows pivot drive means for a bar of the control system according to the invention.

It is also possible, as shown in FIG. 8, to provide a rotary motor 44 extending along the control bar 31a to rotate it by means of a toothed wheel 46 directly driven by this motor and which is engaged in another toothed wheel 47 supported by the control bar 31*a* so as to constitute a geared motor type assembly.

In the example in the figures, the invention is applied to tilting valves, i.e. that pivot about an axis, but the invention can also be applied to valves with different kinematics, such as valves whose opening or closing corresponds to a combination of translation and rotation.

The invention claimed is:

1. A system for controlling discharge doors of a turbomachine, the system comprising:
   a ring; and
   means for connecting the ring to each discharge door, wherein the ring is formed by bars connected end to end by rotary connections ensuring that a pivoting of one bar induces a pivoting of the other bars, each discharge door being connected to a corresponding bar in order to open or close when the corresponding bar pivots, and
   wherein the means for connecting the ring to each discharge door includes the corresponding bar connected to the corresponding discharge door by an arrangement comprising a lever with an end rigidly attached to the corresponding bar, and a connecting rod with a first end connected to the corresponding discharge door and a second end connected to the lever, the first and second ends of the connecting rod being connected to the corresponding discharge door and to the lever by pivot connections with axes parallel to the corresponding bar.

2. The system according to claim 1, wherein the bars comprise alternating control bars and transmission bars, each control bar being connected to a corresponding discharge door in order to open and close the corresponding discharge door.

3. The system according to claim 1, wherein the rotary connections are universal joints.

4. The system according to claim 1, further comprising an actuator connected to the corresponding bar via the lever to make the corresponding bar pivot as the actuator extends and retracts.

5. The system according to claim 1, further comprising a motor rotatably connected to the corresponding bar via a worm screw connection to make the corresponding bar pivot when the motor rotates.

6. The system according to claim 1, further comprising a motor rotatably connected to the corresponding bar via a reduction gear to make the corresponding bar pivot.

7. A turbomachine comprising a control system according to claim 1.

8. A turbojet engine comprising a control system according to claim 1.

* * * * *